United States Patent
He et al.

(10) Patent No.: US 11,267,318 B2
(45) Date of Patent: Mar. 8, 2022

(54) VAPOR INJECTION HEAT PUMP SYSTEM AND CONTROLS

(71) Applicant: Ford Global Technologies, LLC, Dearborn, MI (US)

(72) Inventors: Jing He, Novi, MI (US); Loren John Lohmeyer, Monroe, MI (US); Manfred Koberstein, Troy, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 55 days.

(21) Appl. No.: 16/695,427

(22) Filed: Nov. 26, 2019

(65) Prior Publication Data
US 2021/0155078 A1 May 27, 2021

(51) Int. Cl.
*B60H 1/00* (2006.01)
*B60H 1/22* (2006.01)
*B60H 1/32* (2006.01)

(52) U.S. Cl.
CPC ..... *B60H 1/00907* (2013.01); *B60H 1/00021* (2013.01); *B60H 1/00492* (2013.01); *B60H 1/00807* (2013.01); *B60H 1/00878* (2013.01); *B60H 1/22* (2013.01); *B60H 1/3204* (2013.01); *B60H 1/3213* (2013.01); *B60H 1/32284* (2019.05); *B60H 2001/00928* (2013.01); *B60H 2001/00935* (2013.01); *B60H 2001/00942* (2013.01); *B60H 2001/00949* (2013.01)

(58) Field of Classification Search
CPC ............ B60H 1/00907; B60H 1/00807; B60H 1/00878; B60H 1/3204; B60H 1/00021; B60H 1/00492; B60H 1/22; B60H 1/32284; B60H 1/3213; B60H 2001/00935; B60H 2001/00949; B60H 2001/00928; B60H 2001/00942; B60H 1/3223; B60H 1/323; B60H 2001/00957
See application file for complete search history.

(56) References Cited

U.S. PATENT DOCUMENTS 3,324,671 A * 6/1967 Harnish .................. F25B 13/00
    62/174
4,344,297 A * 8/1982 Ueno ........................ F25B 1/04
    236/80 R (Continued)

FOREIGN PATENT DOCUMENTS

JP             4539571 A        8/2007

*Primary Examiner* — Ljiljana V. Ciric
(74) *Attorney, Agent, or Firm* — Vichit Chea; Price Heneveld LLP

(57) ABSTRACT

A vehicle HVAC system includes a compressor, a first heat exchanger for exchanging heat between the refrigerant outside air, a first check valve set, a first expansion device for decompressing a first portion of the refrigerant, a second heat exchanger for exchanging heat between the first portion of the refrigerant and a second portion of the refrigerant, a second expansion device for decompressing the second portion of the refrigerant, a second check valve set, a third heat exchanger for exchanging heat between the refrigerant and inside air, and a selector valve for switching between a heating mode and a cooling mode. The first check valve set and the second check valve set together maintain a constant flow direction through the first expansion device, the second heat exchanger, and the second expansion device in the heating mode and the cooling mode.

14 Claims, 8 Drawing Sheets

(56) References Cited

U.S. PATENT DOCUMENTS

| | | | | |
|---|---|---|---|---|
| 4,483,151 A * | | 11/1984 | Fujioka | F25D 11/022, 165/43 |
| 5,669,231 A * | | 9/1997 | Itoh | B60H 1/00907, 62/210 |
| 5,704,219 A * | | 1/1998 | Suzuki | B60H 1/00907, 237/2 B |
| 5,752,391 A * | | 5/1998 | Ozaki | B60H 1/3204, 62/228.1 |
| 5,778,691 A * | | 7/1998 | Suzuki | B60H 1/00907, 62/160 |
| 5,878,589 A * | | 3/1999 | Tanaka | B60H 1/00007, 62/199 |
| 5,934,094 A * | | 8/1999 | Itoh | B60H 1/3205, 62/222 |
| 5,996,360 A * | | 12/1999 | Tanaka | B60H 1/00907, 62/159 |
| 6,237,351 B1 * | | 5/2001 | Itoh | B60H 1/00921, 62/113 |
| 6,347,528 B1 * | | 2/2002 | Iritani | B60L 3/0046, 62/324.6 |
| 6,640,889 B1 * | | 11/2003 | Harte | B60H 1/00885, 165/202 |
| 6,705,101 B2 * | | 3/2004 | Brotz | B60H 1/143, 62/198 |
| 6,708,510 B2 * | | 3/2004 | Sulc | F25B 47/022, 62/151 |
| 6,834,514 B2 * | | 12/2004 | Takeuchi | B60H 1/3204, 62/170 |
| 6,843,312 B2 * | | 1/2005 | Burk | B60H 1/025, 165/240 |
| 6,862,892 B1 * | | 3/2005 | Meyer | B60H 1/00878, 165/42 |
| 6,871,629 B2 * | | 3/2005 | Hanson | F25B 27/00, 123/198 C |
| 6,904,766 B2 * | | 6/2005 | Ito | B60H 1/00328, 165/164 |
| 6,910,341 B2 * | | 6/2005 | Srichai | F25B 49/02, 62/115 |
| 6,920,922 B2 | | 7/2005 | Takeuchi | |
| 7,059,150 B2 * | | 6/2006 | Komatsu | B60H 1/323, 62/500 |
| 7,370,486 B2 * | | 5/2008 | Grimm | B60H 1/00885, 62/185 |
| 7,669,647 B2 * | | 3/2010 | Tsubone | B60H 1/32281, 165/202 |
| 7,690,213 B2 * | | 4/2010 | Inaba | B60H 1/00885, 62/238.6 |
| 7,779,647 B2 | | 8/2010 | Takeuchi et al. | |
| 8,001,799 B2 * | | 8/2011 | Obayashi | B60H 1/3211, 62/243 |
| 8,015,835 B2 * | | 9/2011 | Lee | B60H 1/00285, 62/200 |
| 8,613,305 B2 * | | 12/2013 | Yu | B60H 1/00492, 165/47 |
| 8,688,322 B2 * | | 4/2014 | Shigyo | B60H 1/00421, 701/36 |
| 9,441,865 B2 * | | 9/2016 | Inaba | F25B 49/02 |
| 9,459,028 B2 * | | 10/2016 | Styles | F25B 5/02 |
| 9,581,370 B2 | | 2/2017 | Inaba et al. | |
| 9,726,403 B2 * | | 8/2017 | Yamada | B60H 1/00921 |
| 9,951,973 B2 * | | 4/2018 | Jojima | F25B 1/005 |
| 10,363,795 B2 * | | 7/2019 | Lott | F02B 29/0475 |
| 10,500,925 B2 * | | 12/2019 | Oshitani | B60H 1/00485 |
| 10,661,631 B2 * | | 5/2020 | Kawano | F25B 41/40 |
| 10,737,552 B2 * | | 8/2020 | He | F25B 30/02 |
| 10,899,198 B2 * | | 1/2021 | Nishikawa | B60H 1/00899 |
| 10,967,702 B2 * | | 4/2021 | Mancini | B60H 1/32281 |
| 2003/0037553 A1 | | 2/2003 | Sulc | B60H 1/00907, 62/151 |
| 2004/0060316 A1 * | | 4/2004 | Ito | F25B 13/00, 62/324.1 |
| 2004/0079102 A1 * | | 4/2004 | Umebayashi | F24F 3/153, 62/324.1 |
| 2006/0065011 A1 * | | 3/2006 | Komatsu | F25B 5/02, 62/468 |
| 2010/0281901 A1 * | | 11/2010 | Kawase | F25B 25/005, 62/238.7 |
| 2013/0055751 A1 | | 3/2013 | Inaba | |
| 2014/0007613 A1 * | | 1/2014 | Uchida | H05K 7/20881, 62/509 |
| 2014/0208775 A1 * | | 7/2014 | Styles | F25B 5/02, 62/56 |
| 2014/0216085 A1 * | | 8/2014 | Kawakami | B60H 1/323, 62/190 |
| 2014/0326010 A1 * | | 11/2014 | Kawakami | F25B 49/02, 62/222 |
| 2015/0000331 A1 * | | 1/2015 | Jojima | F25B 41/20, 62/498 |
| 2015/0027162 A1 * | | 1/2015 | Ohno | B60H 1/00899, 62/525 |
| 2015/0260442 A1 * | | 9/2015 | Ragazzi | F25D 21/08, 62/80 |
| 2016/0068047 A1 * | | 3/2016 | Kobayashi | B60H 1/3228, 62/401 |
| 2016/0116192 A1 * | | 4/2016 | Kim | F28F 27/00, 62/115 |
| 2016/0116197 A1 * | | 4/2016 | Takeuchi | F25B 5/04, 62/276 |
| 2016/0161164 A1 * | | 6/2016 | Lattin | B60H 1/3227, 62/115 |
| 2016/0178253 A1 * | | 6/2016 | Katoh | H01M 10/625, 62/185 |
| 2016/0200175 A1 * | | 7/2016 | Nakajima | F25B 43/00, 62/500 |
| 2017/0050493 A1 * | | 2/2017 | Nishikawa | B60H 1/00342 |
| 2018/0009291 A1 * | | 1/2018 | Ohishi | B60H 1/00921 |
| 2018/0022185 A1 * | | 1/2018 | Kawano | B60H 1/00899, 165/202 |
| 2018/0201094 A1 | | 7/2018 | Kawano et al. | |
| 2018/0215234 A1 * | | 8/2018 | Lott | F02B 37/16 |
| 2018/0264913 A1 * | | 9/2018 | Enomoto | F01P 7/161 |
| 2019/0070924 A1 * | | 3/2019 | Mancini | B60H 1/00907 |
| 2019/0111764 A1 * | | 4/2019 | Oshitani | B60H 1/323 |
| 2019/0128573 A1 | | 5/2019 | He et al. | |
| 2020/0039323 A1 * | | 2/2020 | He | B60H 1/00899 |
| 2020/0101810 A1 * | | 4/2020 | Takagi | B60H 1/00278 |
| 2020/0101814 A1 * | | 4/2020 | Takagi | B60H 1/00007 |
| 2020/0130472 A1 * | | 4/2020 | Durrani | B60H 1/3223 |
| 2020/0158381 A1 * | | 5/2020 | Kato | F25B 41/39 |
| 2020/0290429 A1 * | | 9/2020 | Blatchley | B60H 1/00278 |
| 2020/0393174 A1 * | | 12/2020 | Lee | F01N 3/02 |
| 2020/0398645 A1 * | | 12/2020 | He | B60H 1/323 |

\* cited by examiner

VAPOR INJECTION HEAT PUMP SYSTEM AND CONTROLS

FIELD OF THE DISCLOSURE

The present disclosure generally relates to heating, ventilation, and air conditioning ("HVAC") systems for vehicles, and more particularly to heat pump systems for vehicles.

BACKGROUND OF THE DISCLOSURE

Various types of HVAC systems have been developed for motor vehicles. Known systems may utilize coolant that has been heated by an internal combustion engine to heat air that is supplied to the passenger compartment. Vehicle HVAC systems may also include air conditioning systems to cool and/or dehumidify air that is supplied to the vehicle interior space.

Heat pumps may be used in the cooling and heating systems of hybrid motor vehicles or entirely battery-powered electric motor vehicles, since a heat pump can be used for both cooling and heating the inside passenger cabin in the absence of the heat source provided by traditional internal combustion engines. In the cooling mode, a heat pump typically operates in the same manner as a traditional air-conditioning system. In the heating mode, a heat pump is typically more efficient than simple electrical resistance heaters and may be more effective at heating than such electrical resistance heaters using the same amount of electricity. Thus, the utilization of a heat pump, in lieu of or in addition to an electrical resistance heater, may be desired to provide an increased driving range in an electric motor vehicle.

One disadvantage of conventional heat pump systems, however, may be decreased efficiency at extreme ambient temperatures. In electric vehicles, this may directly correlate to a decreased driving range. In cold climates, for example, this decrease in efficiency may result in increased use of the electrical resistance heater and, consequently, a decreased driving range for the electric vehicle.

SUMMARY OF THE DISCLOSURE

According to one aspect of the present disclosure, a vehicle HVAC system includes a compressor for compressing refrigerant. The compressor includes an inlet port, a vapor-injection port, and a discharge port. The vehicle HVAC system further includes a first heat exchanger, a first check valve set, a first expansion device for decompressing a first portion of the refrigerant, a second heat exchanger for exchanging heat between the first portion of the refrigerant and a second portion of the refrigerant. The first portion of the refrigerant is directed to the vapor-injection port. The vehicle HVAC system further includes a second expansion device for decompressing the second portion of the refrigerant, a second check valve set, a third heat exchanger for exchanging heat between the refrigerant and inside air, and a selector valve for switching between a heating mode and a cooling mode. The first check valve set and the second check valve set together maintain a constant flow direction through the first expansion device, the second heat exchanger, and the second expansion device in the heating mode and the cooling mode.

Embodiments of the first aspect of the disclosure can include any one or a combination of the following features:

the vehicle HVAC system further include a coolant loop. The coolant loop including the third heat exchanger, a coolant pump, and a fourth heat exchanger wherein the third heat exchanger exchanges heat between the refrigerant and a coolant and the fourth heat exchanger exchanges heat between the coolant and inside air;

the first check valve set includes a first check valve for directing refrigerant from the first heat exchanger to the second heat exchanger and the first expansion device while operating in the cooling mode, and a second check valve for directing refrigerant from the second expansion device to the first heat exchanger while operating in the heating mode;

the second check valve set includes a first check valve for directing refrigerant from the second expansion device to the third heat exchanger while operating in the cooling mode, and a second check valve for directing the refrigerant from the third heat exchanger to the first expansion device and the second heat exchanger while operating in the heating mode;

the vehicle HVAC system further includes an accumulator;

the vehicle HVAC system further includes an electronic control unit configured to control the selector valve, the compressor, and at least one of the first expansion device and the second expansion device based on input received from one or more sensors;

the one or more sensors include a first temperature sensor for measuring a refrigerant temperature proximal to the first heat exchanger, a first pressure sensor for measuring a refrigerant pressure proximal to the first heat exchanger, a second temperature sensor for measuring a refrigerant temperature proximal to the third heat exchanger, a second pressure sensor for measuring a refrigerant pressure proximal to the third heat exchanger, and a third temperature sensor for measuring a refrigerant temperature of the second portion of refrigerant proximal to the second heat exchanger.

According to another aspect of the present disclosure, a vehicle HVAC system includes a compressor. The compressor comprising a low-pressure refrigerant inlet port, a high-pressure refrigerant discharge port, and an intermediate-pressure refrigerant inlet port. The vehicle HVAC system further includes a selector valve for switching between a cooling mode and a heating mode, a first heat exchanger for exchanging heat between the refrigerant and outside air, and an intermediate heat exchanger system. The intermediate heat exchange system includes a first expansion device for decompressing a first portion of high-pressure refrigerant to an intermediate-pressure refrigerant. The intermediate heat exchange system further includes a second heat exchanger for exchanging heat between the intermediate-pressure refrigerant and a second portion of high-pressure refrigerant. The intermediate-pressure refrigerant is directed to the intermediate-pressure refrigerant inlet port of the compressor. The intermediate heat exchange system also includes a second expansion device for decompressing a second portion of high-pressure refrigerant from the second heat exchanger to a low-pressure refrigerant and a plurality of check valves configured to maintain a uniform flow direction through the second heat exchanger, the first expansion device, and the second expansion device between the cooling mode and the heating mode. The vehicle HVAC system further includes a third heat exchanger configured to exchange heat between the refrigerant and interior air. While operating in the cooling mode, the refrigerant flows from the compressor to the first heat exchanger to the intermediate heat exchange system to the third heat exchanger and back to the compressor. While operating in the heating mode, the refrigerant flows from the compressor to the third heat exchanger to the intermediate heat exchange system to the first heat exchanger and back to the compressor.

Embodiments of the second aspect of the disclosure can include any one or a combination of the following features:
the vehicle HVAC system includes an accumulator disposed proximal to the low-pressure refrigerant inlet port of the compressor;
the vehicle HVAC system includes a coolant loop comprising the third heat exchanger, a coolant pump, and a fourth heat exchanger, wherein the third heat exchanger exchanges heat between the refrigerant and a coolant and the fourth heat exchanger exchanges heat between the coolant and inside air;
the plurality of check valves comprises cooling mode check valve set and heating mode check valve set;
the cooling mode check valve set comprises a first cooling mode check valve for directing refrigerant from the first heat exchanger to the intermediate heat exchange system and a second cooling mode check valve for directing refrigerant from the intermediate heat exchange system to the third heat exchanger while operating in the cooling mode and the heating mode check valve set comprises a first heating mode check valve for directing refrigerant from the third heat exchanger to the intermediate heat exchange system, and a second heating mode check valve for directing refrigerant from the intermediate heat exchange system to the first heat exchanger while operating in the heating mode;
the vehicle HVAC system includes an electronic control unit configured to control the selector valve, the compressor, and at least one of the first expansion device and the second expansion device based on input received from one or more sensors; and
the one or more sensors include a first temperature sensor for measuring a refrigerant temperature proximal to the first heat exchanger, a first pressure sensor for measuring a refrigerant pressure proximal to the first heat exchanger, a second temperature sensor for measuring a refrigerant temperature proximal to the third heat exchanger, a second pressure sensor for measuring a refrigerant pressure proximal to the third heat exchanger, and a third temperature sensor for measuring a refrigerant temperature of the second portion of refrigerant proximal to the second heat exchanger.

According to a third aspect of the present disclosure, a vehicle HVAC system includes a vapor injection loop. The vapor injection loop includes a compressor, a first heat exchanger, a first check valve set, a first expansion device, and a second heat exchanger. The vehicle HVAC system further includes a refrigeration loop. The refrigeration loop includes the compressor, the first heat exchanger, the first check valve set, the second heat exchanger, a second expansion device, a second check valve set, and a third heat exchanger.

Embodiments of the third aspect of the disclosure can include any one or a combination of the following features:
the refrigeration loop further includes an accumulator;
the vehicle HVAC system includes a coolant loop, the coolant loop including the third heat exchanger, a coolant pump, and a fourth heat exchanger
the vehicle HVAC system includes a selector valve for switching between a heating mode and a cooling mode;
in the cooling mode, the selector valve directs refrigeration in the refrigeration loop from the compressor to the first heat exchanger, the first check valve set, the second heat exchanger, the second expansion device, the second check valve set, and the third heat exchanger in this order and in a heating mode, the selector valve directs refrigeration in the refrigeration loop from the compressor to the third heat exchanger, the second check valve set, the second heat exchanger, the second expansion device, the first check valve set, and the first heat exchanger in this order; and
the flow direction through the first expansion device, the second heat exchanger, and the second expansion device remains unchanged between the heating mode and the cooling mode.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
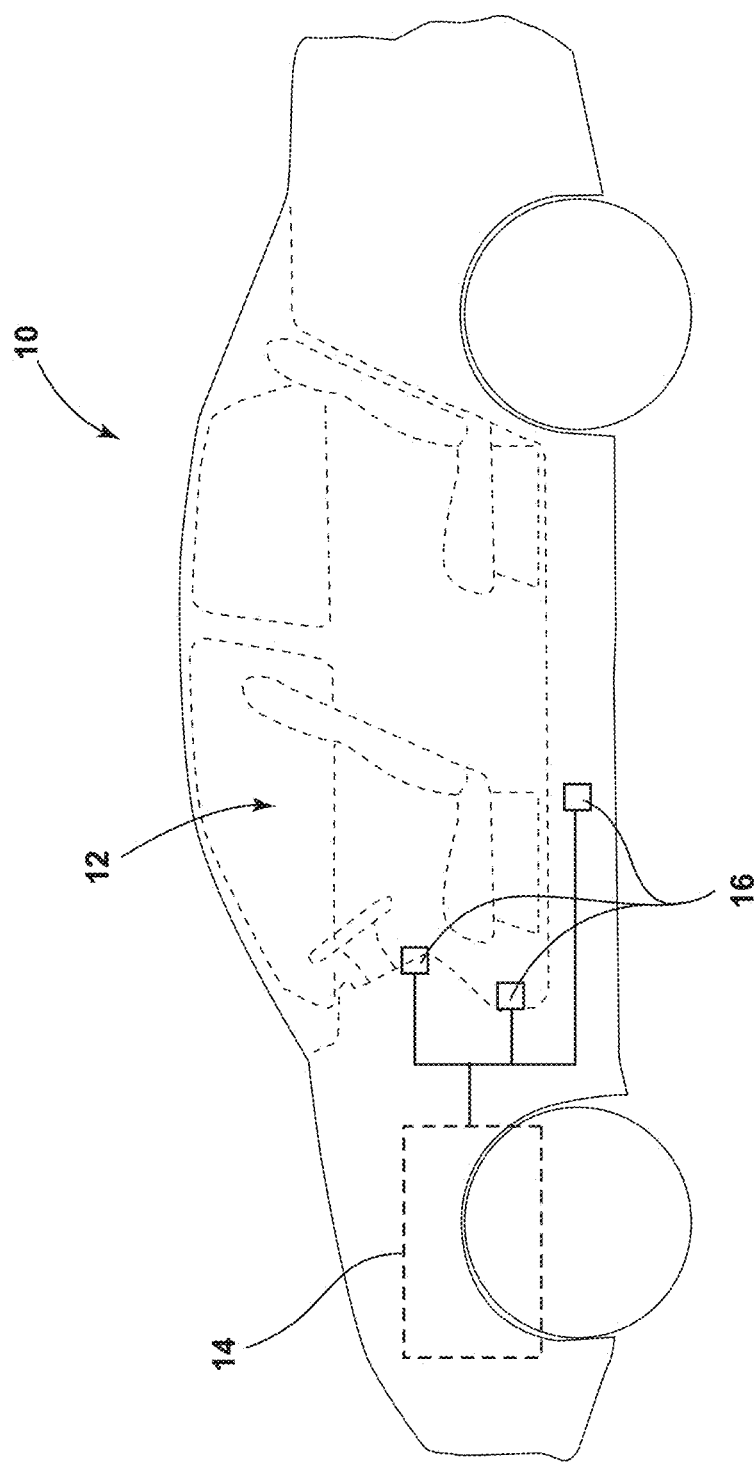
FIG. 1 is a partially schematic side elevational view of a vehicle having a vehicle HVAC system.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIG. 1, a vehicle 10 is illustrated including a passenger compartment 12 configured to house one or more passengers of the vehicle 10. In some instances, heating or cooling of the passenger compartment 12 may be desired to ensure passenger comfort. Accordingly, an HVAC system 14 may include one or more ducts 16 to provide conditioned air to the passenger compartment 12. In some embodiments, the HVAC system 14 may comprise a heat pump system 14. As used herein, the term "heat pump" refers to a vapor-compression refrigeration device optimized for high efficiency in both directions of thermal energy transfer. Such heat pump systems employ a refrigerant as the working fluid in circulation between at least a compressor, a condenser, a decompression device, and an evaporator. In some embodiments, the operation of the heat pump system 14 may be reversible such that the heat pump system 14 may be adapted to work in either direction (e.g., in both a cooling mode and a heating mode to provide cooling or heating to the inside passenger compartment 12 through the one or more ducts 16).

Figure 2:
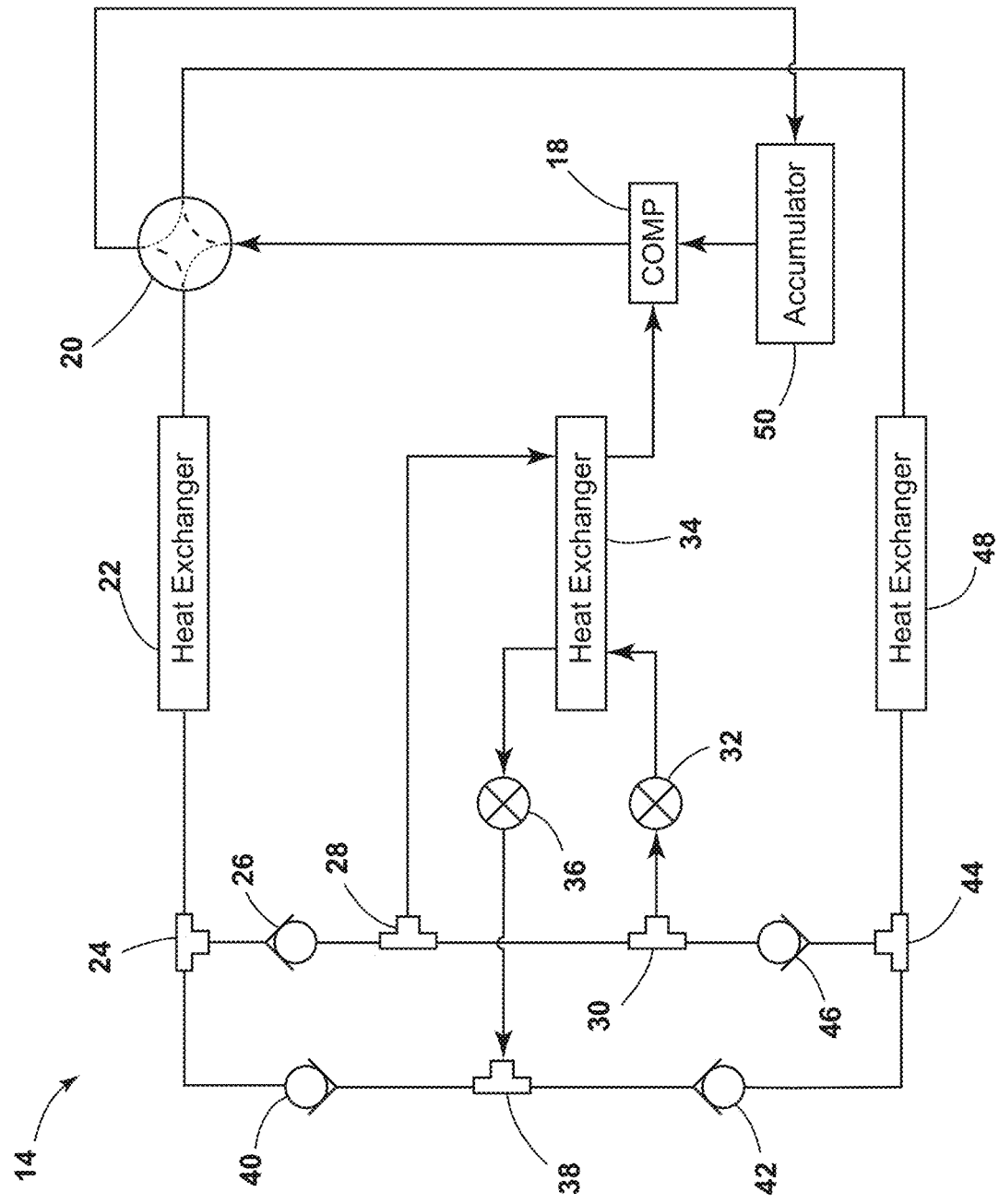
FIG. 2 is a schematic view of a vehicle HVAC system.

Referring to FIG. 2, an exemplary heat pump system 14 is provided according to one embodiment. The heat pump system 14 may include, but is not limited to, a compressor 18, a selector valve 20, a first heat exchanger 22, a plurality of fittings 24, 28, 30, 38, and 44, check valves 26, 40, 42, and 46, a first expansion device 32, a second heat exchanger 34, a second expansion device 36, a third heat exchanger 48, and an accumulator 50.

The compressor 18 may be a vapor injection compressor 18 including a low-pressure inlet port, an intermediate-pressure inlet port (vapor-injection port), and a high-pressure discharge port. The compressor 18 compresses low-pressure refrigerant from the inlet port and the vapor-injection port and outputs high-pressure refrigerant from the discharge port. In some embodiments, the compressor 18 may be a scroll compressor with the vapor-injection port configured to introduce intermediate-pressure refrigerant, through one or more apertures formed in one of the scroll plates, to be mixed with the low-pressure refrigerant partway through the compression cycle. However, any type of suitable compressor 18 may be utilized (e.g., rotary vane compressor, swashplate compressor, screw compressor). Additionally, it is contemplated that vapor may be injected at any point in the compression cycle.

The selector valve 20, as shown, is a two-position four-way selector valve having a high-pressure refrigerant flow path and a low-pressure refrigerant flow path. In the currently shown embodiment, the selector valve 20 may selectively determine a cooling mode and a heating mode. In the cooling mode, the high-pressure refrigerant flow path directs refrigerant from the discharge port of the compressor 18 to the first heat exchanger 22 and the low-pressure refrigerant flow path directs refrigerant from the third heat exchanger 48 to the accumulator 50. In the heating mode, the high-pressure refrigerant flow path directs refrigerant from the discharge port of the compressor 18 to the third heat exchanger 48 and the low-pressure refrigerant flow path directs refrigerant from the first heat exchanger 22 to the accumulator 50. It is contemplated that the selector valve 20 may comprise a plurality of selector valves. It is also contemplated that the selector valve 20 may comprise any number of paths or inputs. For example, in some embodiments, the selector valve 20 may comprise a first three-way valve for directing refrigerant from the compressor 18 to one of the first heat exchanger 22 and the third heat exchanger 48 and a second three-way valve for directing refrigerant from one of the first heat exchanger 22 and the third heat exchanger 48 to the accumulator 50.

The first heat exchanger 22 may exchange heat with air outside of the passenger cabin 12 of vehicle 10. In some embodiments, the first heat exchanger 22 is a refrigerant-to-air heat exchanger for exchanging heat directly with the outside air. In some embodiments, where the first heat exchanger 22 is a refrigerant-to-air heat exchanger, the first heat exchanger 22 may be positioned on the vehicle in a position (e.g., in a front portion of the vehicle 10) likely to direct outside air over an exterior surface of the first heat exchanger 22. The vehicle 10 may additionally include one or more air guides for directing air over the exterior surface of the first heat exchanger. For example, in some embodiments the first heat exchanger 22 may be a tube-and-fin heat exchanger positioned behind a front grille of the vehicle 10, and the vehicle may include one or more air guides disposed around the edges of the grille and between the grille and the first heat exchanger 22 for directing outside air through one or more fins of the first heat exchanger 22 while the vehicle 10 is in motion. In some embodiments, the first heat exchanger 22 may be a refrigerant-to-coolant heat exchanger (e.g., a water-cooled condenser) to exchange heat with the outside air through one or more liquid heat exchange mediums (e.g., a mixture of ethylene glycol and water). In such examples, the first heat exchanger 22 may be any suitable structure for exchanging heat between two contained fluids (e.g., a plate heat exchanger or a shell and tube heat exchanger). In some examples, the first heat exchanger 22 may be part of an additional heat exchange cycle or loop for exchanging heat with one or more components of the vehicle 10.

Fittings 24, 28, 30, 38, and 44 may be included for directing the flow of refrigerant through the heat pump system 14. As shown in one embodiment, fittings 24, 28, 30, 38, and 44 are t-shaped fittings. In the currently shown embodiment, depending on the position of the fitting in the heat pump system 14, and upon a mode of operation, the fittings may have a single inlet and a single outlet or a single inlet with two outlets. However, it is contemplated that the number of fittings, the type of fittings, the positioning of the fittings in the heat pump system 14, and the inlet-outlet configurations of the fittings may vary in different embodiments without departing from the scope of the present disclosure.

Check valves may be included for maintaining uniform refrigerant flow direction through one or more components of the heat pump system 14. The check valves may be any suitable check valve type for allowing refrigerant to flow through the check valve in only a single direction (e.g., a swing-type check valve, a lift-type check valve, a dual-plate check valve, a stop check valve, or a magnetic check valve).

The embodiment shown in FIG. 2 includes a first check valve set and a second check valve set. Each of the first check valve set and the second check valve set may comprise a pair of reversed-flow check valves, that is to say, a first check valve and a second check valve with opposing flow directions with respect to each other, positioned proximally to the first heat exchanger 22 and/or the third heat exchanger 48. According to various embodiments, the first check valve set includes a first cooling mode check valve 26 positioned proximally to the first heat exchanger 22 allowing refrigerant to flow from the first heat exchanger 22 while operating in the cooling mode, and a second heating mode check valve 40 positioned proximally to the first heat exchanger 22 allowing refrigerant to flow into the first heat exchanger 22 while operating a heating mode. The second check valve set includes a second cooling mode check valve 42 positioned proximally to the third heat exchanger 48 allowing refrigerant to flow into the third heat exchanger 48 while operating in the cooling mode, and a first heating mode check valve 46 positioned proximally to the third heat exchanger 48 allowing refrigerant to flow from the third heat exchanger 48 while operating a heating mode.

According to various aspects, only one of the check valves in each of the first check valve set and the second check valve set is open while operating in a selected mode. For example, while operating in the cooling mode, the first cooling mode check valve 26 may allow refrigerant to flow from the first heat exchanger 22 to the first expansion device 32 and the second heat exchanger 34 while the second heating mode check valve 40 remains closed and the second cooling mode check valve 42 allows refrigerant to flow from the second expansion device 36 to the third heat exchanger 48 while the first heating mode check valve 46 remains closed. In comparison, while operating in the heating mode, the first heating mode check valve 46 allows refrigerant to flow from the third heat exchanger 48 to the first expansion device 32 and the second heat exchanger 34 while the second cooling mode check valve 42 remains closed and the second heating mode check valve 40 allows refrigerant to flow from the second expansion device 36 to the first heat exchanger 22 while the first cooling mode check valve 26 remains closed.

The first expansion device 32 may be used for decreasing the pressure of a high-pressure refrigerant to an intermediate pressure refrigerant prior to entering an intermediate-pressure refrigerant inlet of the second heat exchanger 34. Suitable expansion devices may include, but are not limited to, thermal expansion valves, manual expansion valve, capillary tubes, automatic valves, electronic expansion valves, low-pressure float valves, and high-pressure float valves. In the currently shown embodiment, the first expansion device 32 may be a thermal expansion device to decrease the pressure of a high-pressure refrigerant to an intermediate pressure refrigerant. In embodiments where the first expansion device 32 is a thermal expansion valve, it may include a sensing bulb disposed between an intermediate-pressure outlet of the second heat exchanger 34 and the compressor 18. The sensing bulb may contain a phase change material and be in fluid communication via a capillary tube with an internal membrane of the thermal expansion device to adjust the refrigerant flow through the thermal expansion valve to maintain a desired level of superheat through the second heat exchanger 34. In some embodiments, the first expansion device 32 may be an electronic expansion valve with a temperature sensor disposed between an intermediate-pressure outlet of the second heat exchanger 34 and the compressor 18 to maintain a desired superheat.

Figure 6:
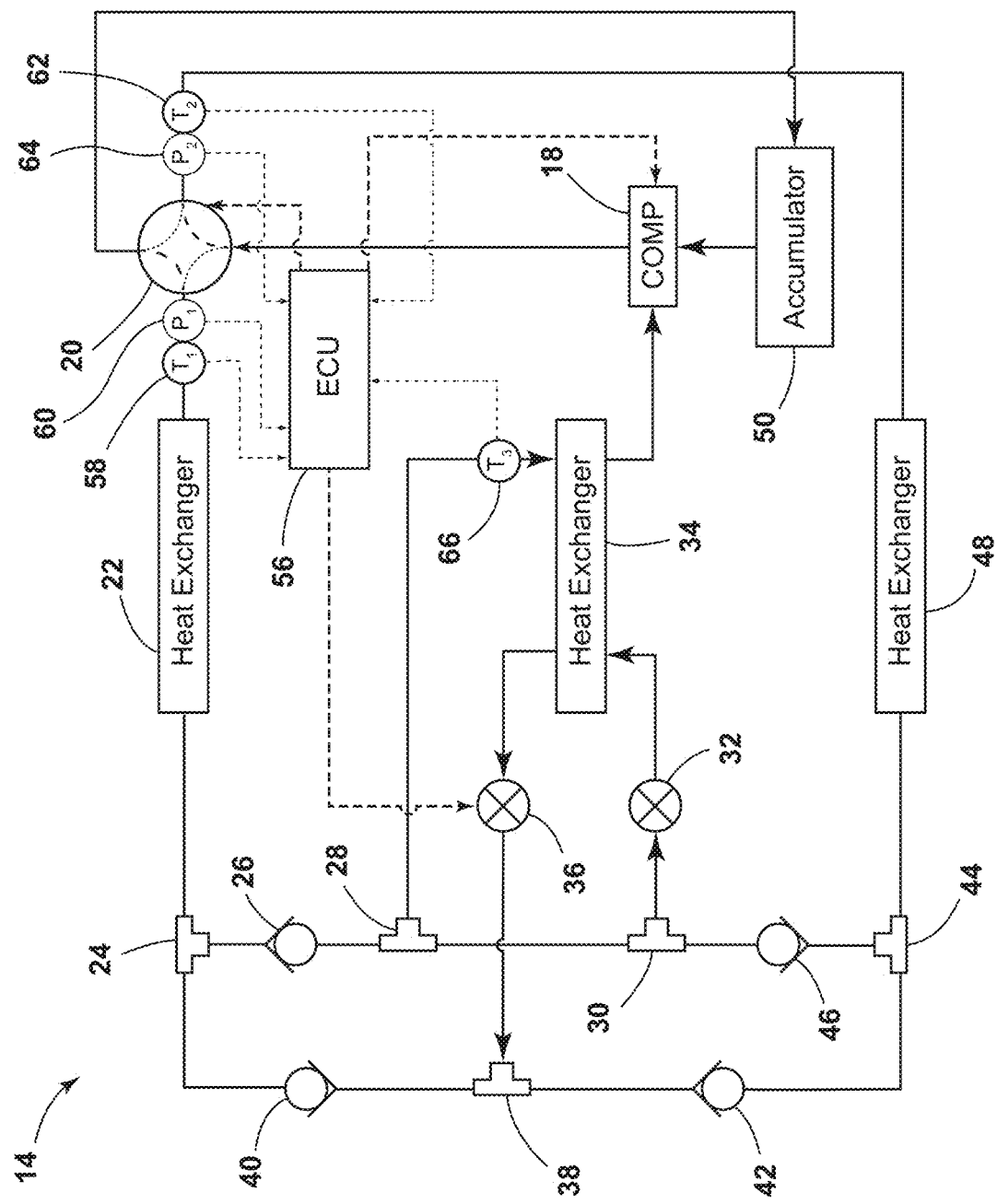
FIG. 6 is a schematic view of an exemplary control system of a vehicle HVAC system.

The second expansion device 36 may be used for decreasing the pressure of a high-pressure refrigerant from a high-pressure outlet of the second heat exchanger 34 to a low-pressure refrigerant prior to entering the third heat exchanger 48 in the cooling mode or the first heat exchanger 22 in the heating mode. Suitable expansion devices may include, but are not limited to, thermal expansion valves, manual expansion valves, capillary tubes, automatic valves, electronic expansion valves, low-pressure float valves, and high-pressure float valves. In a preferred embodiment, the second expansion device 36 is an electronic expansion valve. As shown in FIG. 6, the second expansion device 36 may be controlled dependent upon a first pressure sensor 60 proximal to the first heat exchanger 22 and a third temperature sensor 66 proximal to the second heat exchanger 34 in the cooling mode, or upon a second pressure sensor 64 proximal to the third heat exchanger 48 and the third temperature sensor 66 in the heating mode, to maintain a desired degree of subcooling. In some embodiments, the second expansion device may be a thermal expansion valve with a sensing bulb disposed upstream from the accumulator 50 for maintaining a desired superheat through one of the first heat exchanger 22 and the third heat exchanger 48 depending upon a mode of operation.

The second heat exchanger 34 may be a refrigerant-to-refrigerant heat exchanger according to some examples. In the shown embodiment, the second heat exchanger 34 has a high-pressure refrigerant flow path and an intermediate-pressure refrigerant flow path and exchanges heat between the two flow paths. In the currently shown embodiment, the second heat exchanger may be a plate heat exchanger, but other suitable heat exchangers (e.g., shell-and-tube heat exchangers) are contemplated.

The third heat exchanger 48 may exchange heat with air inside of the passenger cabin 12 of vehicle 10. In some embodiments, the third heat exchanger 48 is a refrigerant-to-air heat exchanger for exchanging heat directly with the inside air. In embodiments where the third heat exchanger 48 is a refrigerant-to-air heat exchanger, the third heat exchanger 48 may be disposed within a mixing chamber 68 of an HVAC case (FIG. 7) positioned proximal to the passenger compartment 12 of the vehicle 10. The vehicle 10 may additionally include an HVAC blower for directing air 72 (FIGS. 7 and 8) from a cowl of the vehicle 10 over the third heat exchanger 48 and through the one or more ducts 16. In some embodiments, the third heat exchanger 48 may be a refrigerant-to-coolant heat exchanger positioned outside the mixing chamber 68 to exchange heat with the inside air through a coolant loop 76 and a fourth heat exchanger 74 (FIG. 8). The coolant loop 76 may include a pump for circulating coolant through the coolant loop 76.

The accumulator 50 may be provided to store excess refrigerant and avoid excessive liquid refrigerant from entering the compressor 18 to prevent damage to the compressor 18. The accumulator 50 may include a refrigerant inlet for receiving low-pressure refrigerant, a storage compartment for storing excess refrigerant, and a discharge port configured to provide substantially vapor refrigerant to the compressor 18.

Figure 3:
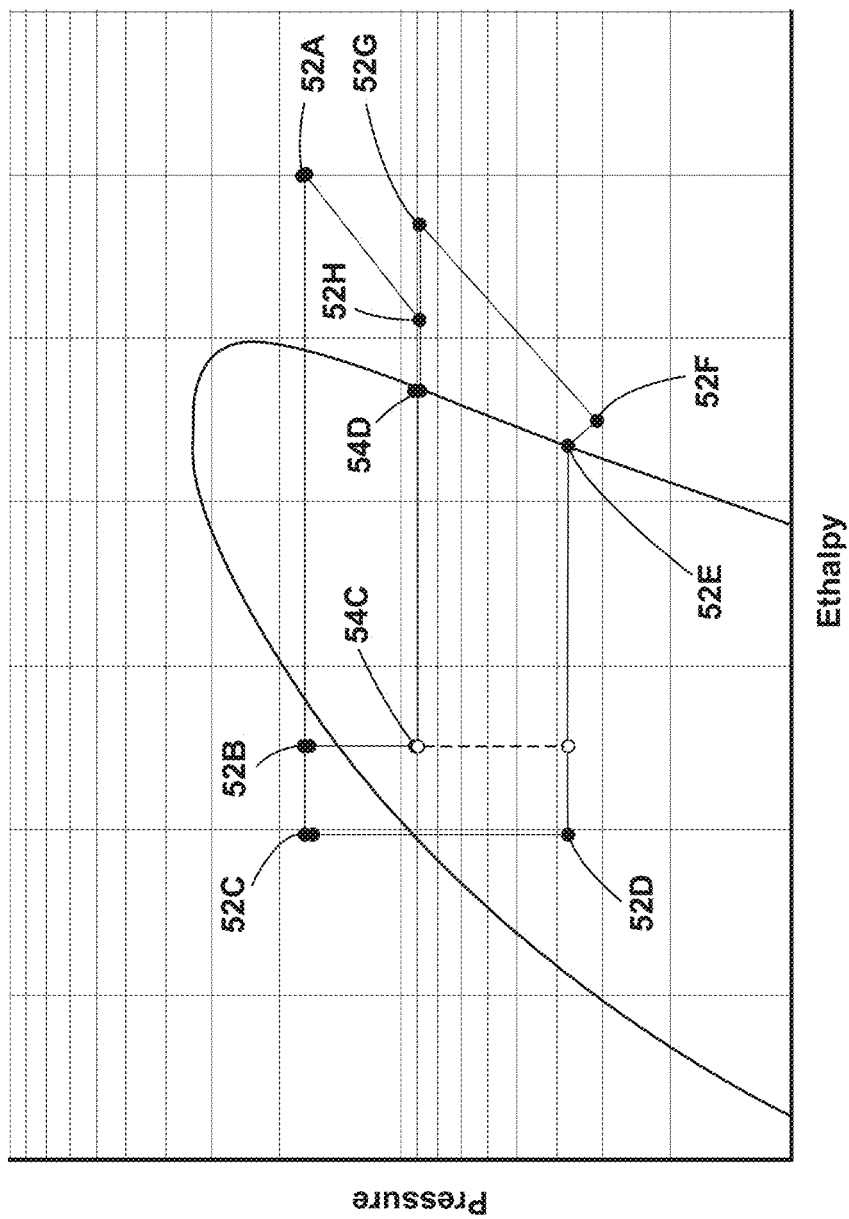
FIG. 3 is a pressure-enthalpy (p-h) diagram of an exemplary vapor injection heat pump system.
Figure 4:
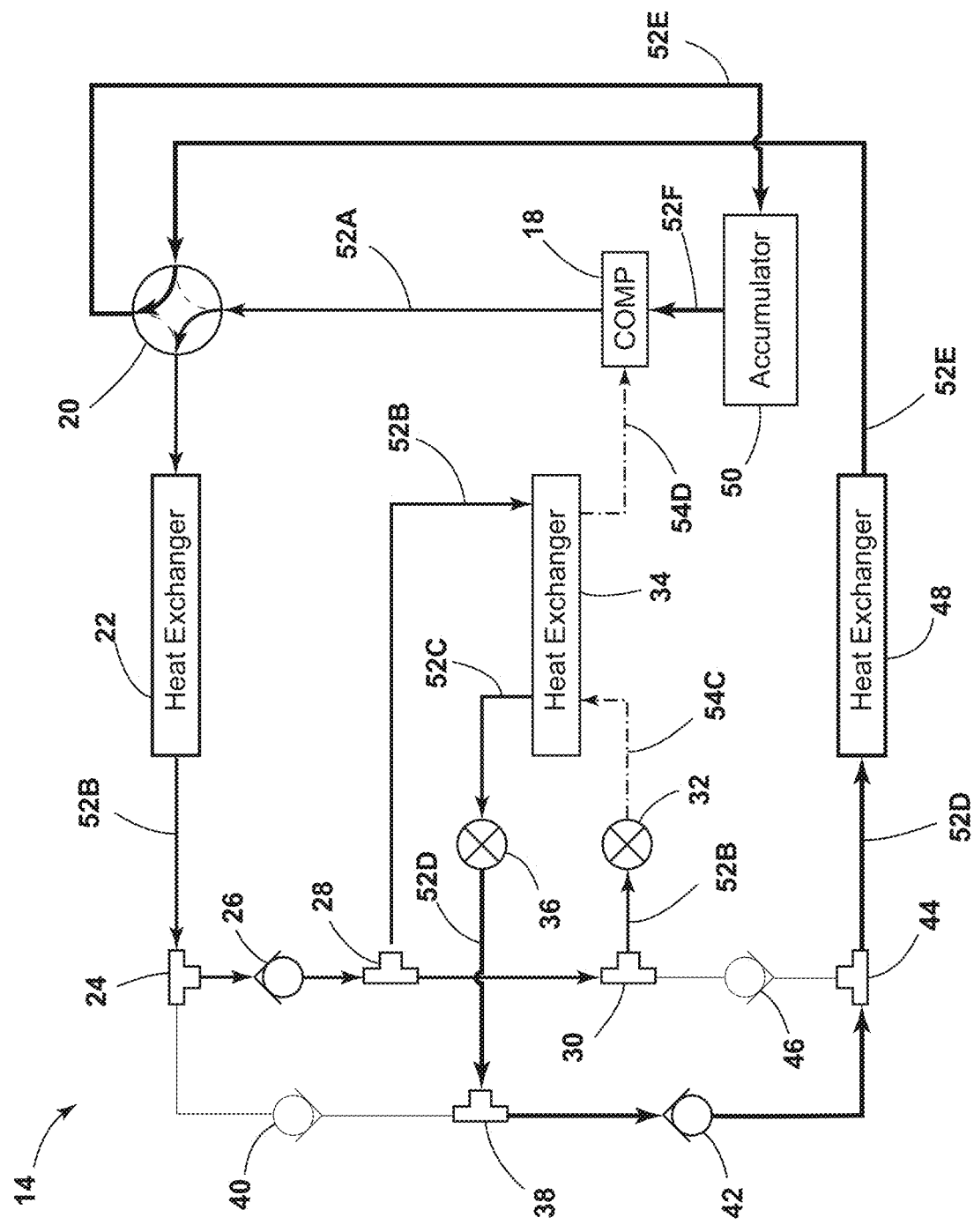
FIG. 4 is a schematic view of a vehicle HVAC system operating in a cooling mode.

Referring now to FIGS. 3 and 4, a cooling mode, as determined by a first position of the selector valve 20, is provided. High-pressure, high-temperature, vapor refrigerant 52A exits the discharge port of the compressor 18 where it is directed through the high-pressure refrigerant flow path of the sector valve 20 and directed to an input port of the first heat exchanger 22.

As the refrigerant passes through the first heat exchanger 22, the high-pressure, high-temperature, vapor refrigerant 52A exchanges heat with outside air and becomes high-pressure, high-temperature, liquid refrigerant 52B. The high-pressure, high-temperature, liquid refrigerant 52B is then directed through fitting 24 and check valve 26 to fitting 28 where it splits into a vapor injection flow path and a refrigeration flow path.

The refrigeration flow path continues to the high-pressure refrigerant flow path of the second heat exchanger 34. The vapor injection flow path continues through fitting 30 to the first expansion device 32. As it passes through the first expansion device 32, the high-pressure, high-temperature, liquid refrigerant 52B decreases in pressure to become an intermediate-pressure, intermediate-temperature, liquid-vapor mixture 54C. The intermediate-pressure, intermediate-temperature, liquid-vapor mixture 54C is then directed to the intermediate-pressure refrigerant flow path of the second heat exchanger 34. As the high-pressure, high-temperature, liquid refrigerant 52B flows through the second heat exchanger 34, the refrigerant exchanges heat with the intermediate-pressure, intermediate-temperature, liquid-vapor mixture 54C to become a high-pressure, subcooled refrigerant 52C. As the intermediate-pressure, intermediate-temperature, liquid-vapor mixture 54C exchanges heat with the high-pressure, high-temperature, liquid refrigerant 52B the refrigerant becomes an intermediate-pressure, intermediate-temperature, vapor refrigerant 54D and is directed to the vapor-injection port of the compressor 18.

The high-pressure, subcooled refrigerant 52C continues from a high-pressure discharge port of the second heat exchanger 34 to the second expansion device 36. As it passes through the second expansion device 36, the high-pressure, subcooled refrigerant 52C decreases in pressure to become a low-pressure, low-temperature, liquid-vapor mixture 52D. A low-pressure, low-temperature, liquid-vapor mixture 52D is then directed through fitting 38, check valve 42, and fitting 44 to an inlet of the third heat exchanger 48. The low-pressure, low-temperature, liquid-vapor mixture 52D is prevented from flowing through a check valve 40, as those valves are held shut by the high-pressure, high-temperature, liquid refrigerant 52B pushing in the opposite direction.

As the low-pressure, low-temperature, liquid-vapor mixture 52D flows through the third heat exchanger 48 it exchanges heat with the inside air of the passenger cabin 12 and becomes a low-pressure, low-temperature, mostly vapor, refrigerant 52E. The low-pressure, low-temperature, mostly vapor, refrigerant 52E is then directed through the low-pressure refrigerant flow path of the selector valve 20 to the accumulator 50 where the refrigerant drops slightly in pressure and only a vapor portion of the refrigerant 52F is returned to the low-pressure inlet port of the compressor 18.

The vapor portion of the refrigerant 52F is then compressed by the compressor 18 to an intermediate-pressure, intermediate-temperature, superheated vapor 52G and combined with the intermediate-pressure, intermediate-temperature, vapor refrigerant 54D from the vapor-injection inlet to form a combined refrigerant 52H. The combined refrigerant 52H is then compressed further and exits the high-pressure discharge port of the compressor 18 as the high-pressure, high-temperature, vapor refrigerant 52A.

Figure 5:
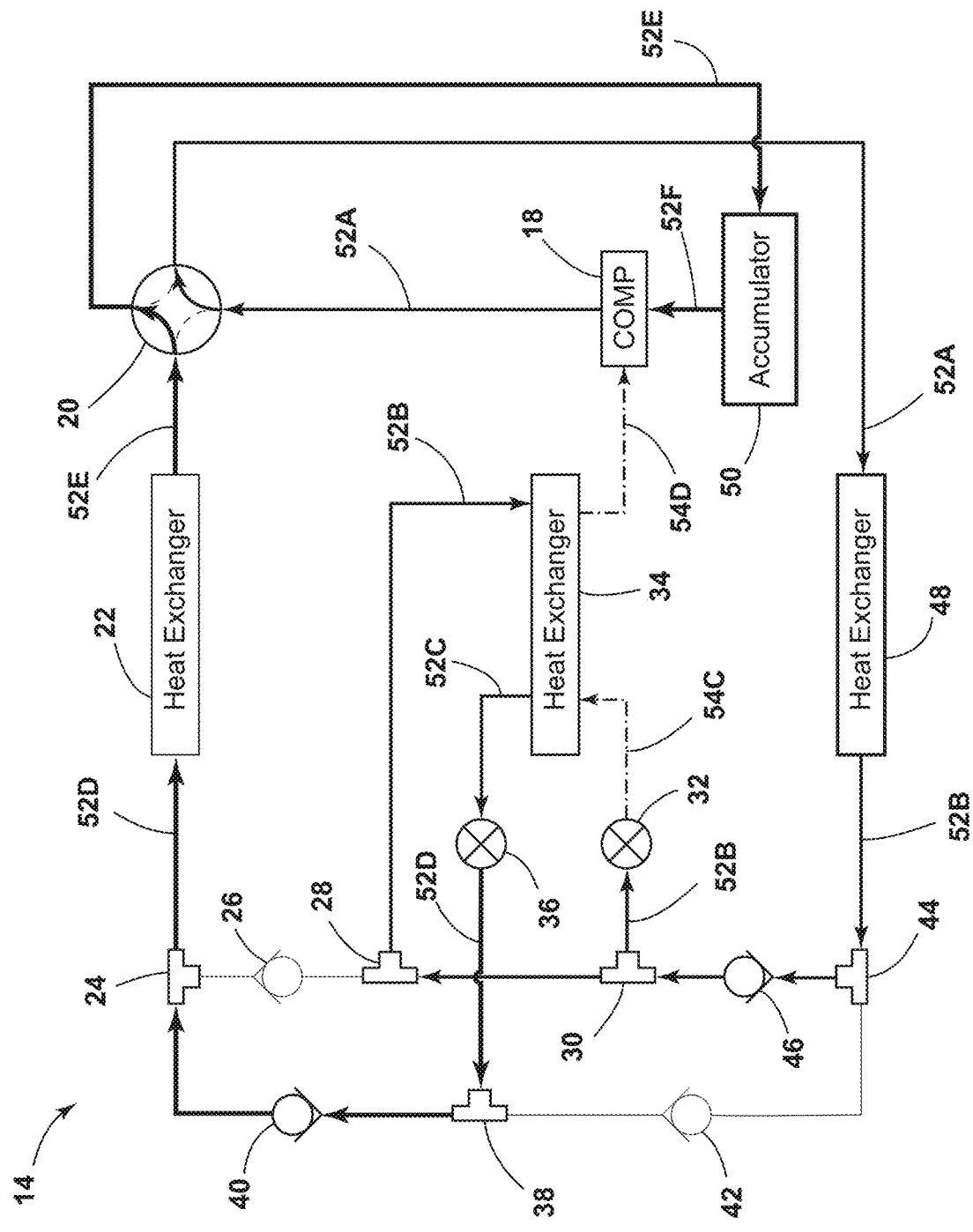
FIG. 5 is a schematic view of a vehicle HVAC system operating in a heating mode.

Referring now to FIGS. 3 and 5, a heating mode, as determined by a second position of the selector valve 20, is provided. High-pressure, high-temperature, vapor refrigerant 52A exits the discharge port of the compressor 18 where it is directed through the high-pressure refrigerant flow path of the sector valve 20 and directed to an input port of the third heat exchanger 48.

As it passes through the third heat exchanger 48, the high-pressure, high-temperature, vapor refrigerant 52A exchanges heat with inside air of the passenger compartment 12 of the vehicle 10 and becomes high-pressure, high-temperature, liquid refrigerant 52B. The high-pressure, high-temperature, liquid refrigerant 52B is then directed through fitting 44 and check valve 46 to fitting 30 where it splits into a vapor injection flow path and a refrigeration flow path.

The refrigeration flow path continues through fitting 28 to the high-pressure refrigerant flow path of the second heat exchanger 34. The vapor injection flow path continues to the first expansion device 32. As it passes through the first expansion device 32, the high-pressure, high-temperature, liquid refrigerant 52B decreases in pressure to become an intermediate-pressure, intermediate-temperature, liquid-vapor mixture 54C. The intermediate-pressure, intermediate-temperature, liquid-vapor mixture 54C is then directed to the intermediate-pressure refrigerant flow path of the second heat exchanger 34. As the high-pressure, high-temperature, liquid refrigerant 52B flows through the second heat exchanger 34, the refrigerant exchanges heat with the intermediate-pressure, intermediate-temperature, liquid-vapor mixture 54C to become a high-pressure, subcooled refrigerant 52C. As the intermediate-pressure, intermediate-temperature, liquid-vapor mixture 54C exchanges heat with the high-pressure, high-temperature, liquid refrigerant 52B it becomes an intermediate-pressure, intermediate-temperature, vapor refrigerant 54D and is directed to the vapor-injection port of the compressor 18.

The high-pressure, subcooled refrigerant 52C continues from a high-pressure discharge port of the second heat exchanger 34 to the second expansion device 36. As it passes through the second expansion device 36, the high-pressure, subcooled refrigerant 52C decreases in pressure to become a low-pressure, low-temperature, liquid-vapor mixture 52D. The low-pressure, low-temperature, liquid-vapor mixture 52D is then directed through fitting 38, check valve 40, and fitting 24 to an inlet of the first heat exchanger 22. The low-pressure, low-temperature, liquid-vapor mixture 52D is prevented from flowing through check valve 42 and check valve 26 as those valves are held shut by the high-pressure, high-temperature, liquid refrigerant 52B pushing in the opposite direction.

As the low-pressure, low-temperature, liquid-vapor mixture 52D flows through the first heat exchanger 22 it exchanges heat with the outside air and becomes a low-pressure, low-temperature, mostly vapor, refrigerant 52E. The low-pressure, low-temperature, mostly vapor, refrigerant 52E is then directed through the low-pressure refrigerant flow path of the selector valve 20 to the accumulator 50 where the refrigerant drops slightly in pressure and only a vapor portion of the refrigerant 52F is returned to the low-pressure inlet port of the compressor 18.

The vapor portion of the refrigerant 52F is then compressed by the compressor 18 to an intermediate-pressure, intermediate-temperature, superheated vapor 52G and combined with the intermediate-pressure, intermediate-temperature, vapor refrigerant 54D from the vapor-injection inlet to form a combined refrigerant 52H. The combined refrigerant 52H is then compressed further and exits the high-pressure discharge port of the compressor 18 as the high-pressure, high-temperature, vapor refrigerant 52A.

Referring now to FIGS. 3-5, in both the heating mode and the cooling mode, the heat pump system 14 includes a high pressure side, an intermediate pressure side, and a low pressure side. In the cooling mode, the high pressure side includes refrigerants 52A-52C and has an exemplary pressure range of 10 to 27 bar, the intermediate-pressure side includes refrigerants 54C and 54D and has an exemplary pressure range of 4 bar to 8 bar, and the low-pressure side includes refrigerants 52D-52F and has an exemplary pressure range of 3.3 bar to 5 bar. Temperature wise, refrigerant 52A discharged from the compressor 18 represents the highest temperature with an exemplary range of 50 degrees Celsius to 105 degrees Celsius, refrigerants 54C and 54D after the first expansion device 32 represent the intermediate temperature with an exemplary range of 25 degrees Celsius to 45 degrees Celsius, and refrigerants 52D-52F after the second expansion device 36 represent the low temperature with an exemplary range of 2 degrees Celsius to 15 degrees Celsius. In a heating mode, the high pressure side includes refrigerants 52A-52C and has an exemplary pressure range of 10 bar to 25 bar, the intermediate-pressure side includes refrigerants 54C and 54D and has an exemplary pressure range of 2.4 bar to 6.7 bar, and the low-pressure side includes refrigerants 52D-52F and has an exemplary pressure range of 1.1 bar to 3.7 bar. Temperature wise, refrigerant 52A discharged from the compressor 18 represents the highest temperature with an exemplary range of 60 degrees Celsius to 130 degrees Celsius, refrigerants 54C and 54D after the first expansion device 32 represent the intermediate temperature with an exemplary range of −8 degrees Celsius to 20 degrees Celsius, and refrigerants 52D-52F after the second expansion device 36 represent the low temperature with an exemplary range of −27 degrees Celsius to 6 degrees Celsius. The preceding pressures and temperatures relate to R1234yf refrigerant in exemplary conditions. While exemplary pressures and temperatures are given, they are for an example only. A skilled artisan will appreciate that temperature ranges may vary greatly depending upon many factors including, but not limited to, ambient air temperature, refrigerant type, and system design. Actual temperatures may exceed or fall short of the given ranges without departing from the scope of the disclosure.

Referring now to FIG. 6, a heat pump electronic control (ECU) unit 56 may be provided for controlling one or more components of the heat pump system 14 in response to data received from one or more sensors the control unit may include a microprocessor or other analog and/or digital control circuitry. In the shown embodiment, a first temperature sensor 58 and a first pressure sensor 60 are disposed proximal to the first heat exchanger 22, a second temperature sensor 62 and a second pressure sensor 64 are disposed proximal to the third heat exchanger 48, and a third temperature sensor 66 is disposed proximal to the second heat exchanger 34. The heat pump control unit 56 may control the second expansion device 36 and the compressor 18 based on the received data from sensors 58, 60, 62, 64, and 66 to maintain a desired subcooling and/or superheating of the refrigerant through the first heat exchanger 22, the second heat exchanger 34, and the third heat exchanger 48. For example, in the cooling mode, the first pressure sensor 60 disposed at an inlet of the first heat exchanger 22 may provide an indication of saturation temperature of the first heat exchanger 22. The third temperature sensor 66 may provide an indication of refrigerant temperature at an outlet of the first heat exchanger 22. The heat pump control unit 56 may then calculate the subcooling of refrigerant through the first heat exchanger 22 based on the received data. If a different subcooling is desired, the heat pump control unit 56 may further open or close the second expansion device 36 to reach the desired subcool. In a heating mode, the subcooling of the third heat exchanger 48 may be maintained in a similar way via opening or closing the second expansion device 36 to reach the desired subcool using data received from the second pressure sensor 64 and the third temperature sensor 66. In an alternative embodiment, the first expansion device 32 may comprise an electronic expansion valve controlled by the heat pump control unit 56 and a fourth temperature sensor may be disposed at the outlet of the intermediate-pressure refrigerant flow path of the second heat exchanger 34 for controlling the superheating of refrigerant flowing through the intermediate-pressure refrigerant flow path.

Figure 7:
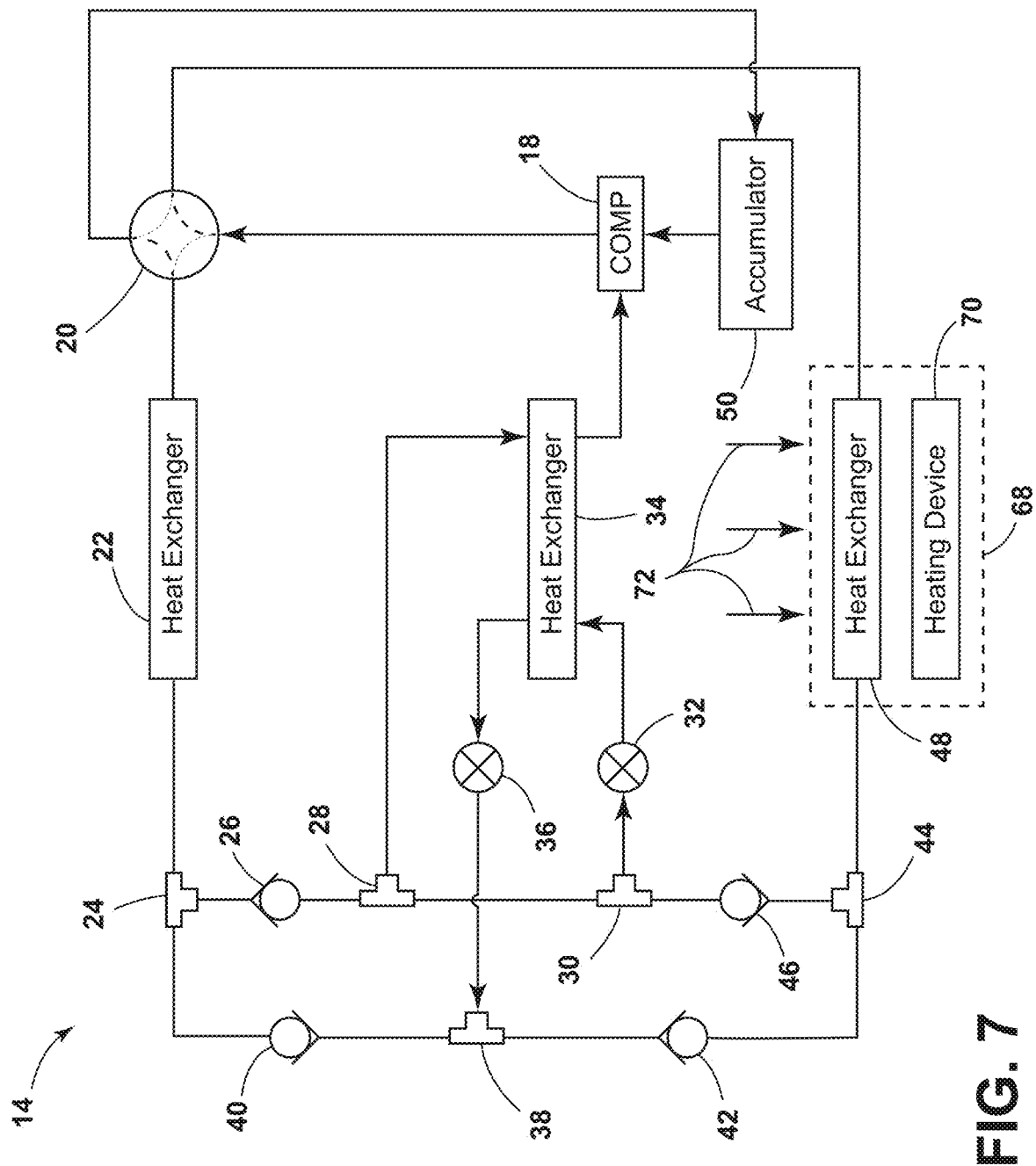
FIG. 7 is a schematic view of a vehicle HVAC system.
Figure 8:
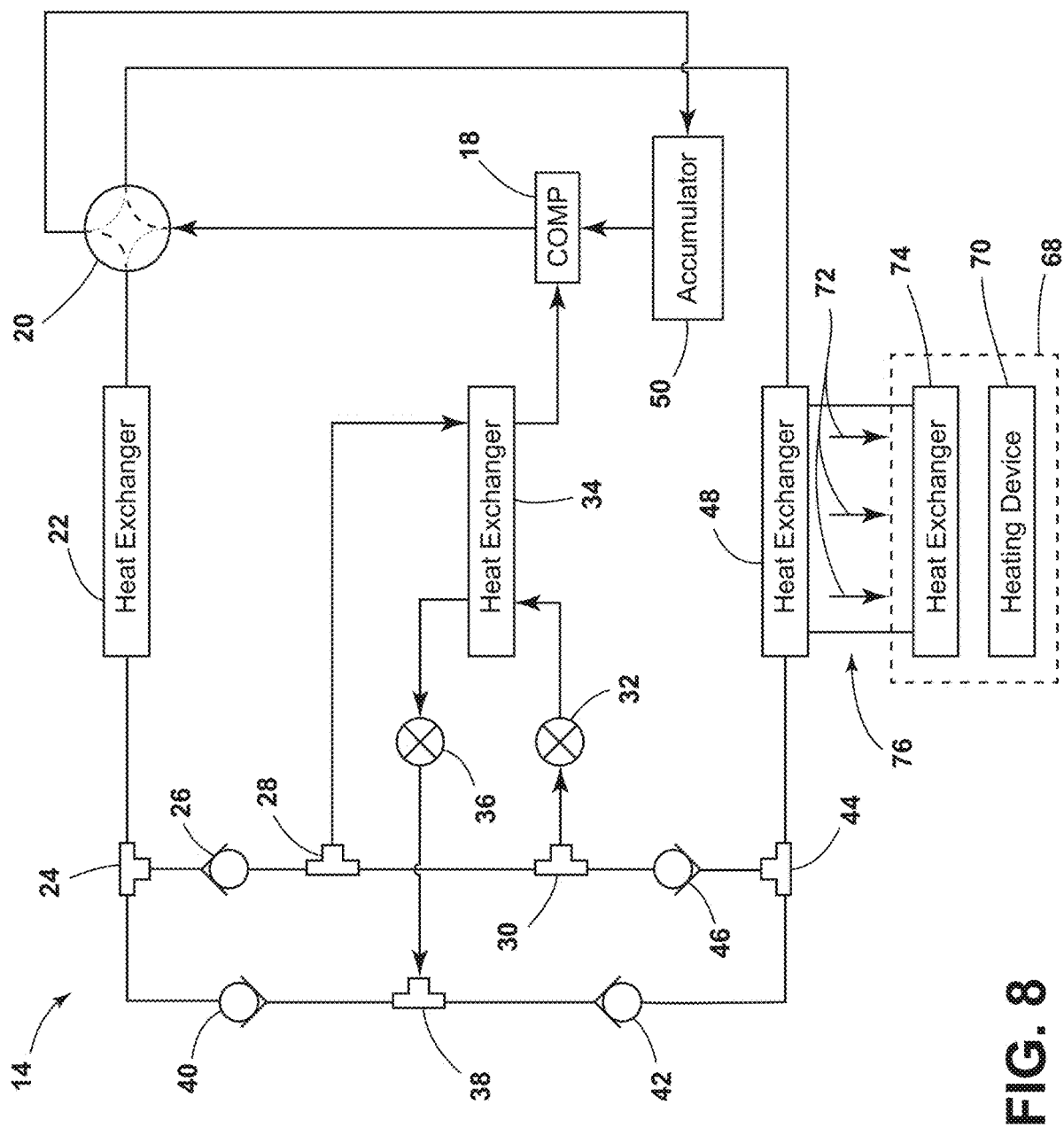
FIG. 8 is a schematic view of a vehicle HVAC system including a coolant loop.

Referring now to FIG. 7, in some embodiments, the third heat exchanger 48 may be disposed within a mixing chamber 68 of an HVAC case. An HVAC blower may direct air 72 from the outside of the vehicle 10 and over an external surface of the third heat exchanger 48. The air 72 may be heated/or cooled by the third heat exchanger 48 and travel through the one or more ducts 16 (FIG. 1) to heat or cool the passenger compartment 12 of the vehicle 10. In some embodiments, an auxiliary heating device 70 may be provided to supplement the heat pump system 14 as needed to maintain passenger comfort. The auxiliary heating device 70 may be an electrical resistance heater.

Referring now to FIG. 8, in some embodiments, the third heat exchanger 48 may be disposed externally to the mixing chamber 68 and may exchange heat with the passenger compartment 12 through a coolant loop 76. In such embodiments, the third heat exchanger 48 may be a refrigerant-to-coolant heat exchanger to exchange heat between the heat pump system 14 and the coolant loop 76. A fourth heat exchanger 74 may be fluidly coupled to the third heat exchanger 48 through the coolant loop 76. The fourth heat exchanger 74 may be disposed within the mixing chamber 68 to exchange heat between the coolant loop 76 and the air 72 entering the passenger compartment 12 through the one or more ducts 16.

A variety of advantages may be derived from the use of the present disclosure. For example, the use of vapor injection increases the operable ambient range of the heat pump system to increase efficiency in extreme ambient temperatures. Moreover, the current disclosure allows for vapor injection to be utilized in both a heating and a cooling mode for increased benefit in both high ambient temperatures and low ambient temperatures. The vehicle HVAC system provided herein also provides a valve system for reversing the flow of refrigerant through the first and third heat exchangers while maintaining a constant flow direction through the second heat exchanger and first and second expansion devices. As, the flow direction is maintained automatically, the resulting control system may also be simplified.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle HVAC system comprising:
a compressor for compressing refrigerant, the compressor comprising an inlet port, a vapor-injection port, and a discharge port;
a first heat exchanger;
a first check valve set;
a first expansion device for decompressing a first portion of the refrigerant;
a second heat exchanger for exchanging heat between the first portion of the refrigerant and a second portion of the refrigerant, wherein the first portion of the refrigerant is directed to the vapor-injection port of the compressor;
a second expansion device for decompressing the second portion of the refrigerant;
a second check valve set;
a third heat exchanger; and
a selector valve for switching between a heating mode and a cooling mode;
wherein the first check valve set and the second check valve set are configured to together maintain a constant flow direction through the first expansion device, the second heat exchanger, and the second expansion device in the heating mode and the cooling mode.

2. The vehicle HVAC system of claim 1, further comprising a coolant loop comprising the third heat exchanger, a coolant pump, and a fourth heat exchanger; wherein the third heat exchanger exchanges heat between the refrigerant and a coolant and the fourth heat exchanger exchanges heat between the coolant and inside air.

3. The vehicle HVAC system of claim 1, wherein the first check valve set comprises:
a first check valve for directing refrigerant from the first heat exchanger to the second heat exchanger and the first expansion device while operating in the cooling mode; and
a second check valve for directing refrigerant from the second expansion device to the first heat exchanger while operating in the heating mode.

4. The vehicle HVAC system of claim 1, wherein the second check valve set comprises:
a first check valve for directing refrigerant from the second expansion device to the third heat exchanger while operating in the cooling mode; and
a second check valve for directing the refrigerant from the third heat exchanger to the first expansion device and the second heat exchanger while operating in the heating mode.

5. The vehicle HVAC system of claim 1, further comprising an accumulator.

6. The vehicle HVAC system of claim 1, further comprising:
an electronic control unit configured to control the selector valve, the compressor, and at least one of the first expansion device and the second expansion device based on input received from one or more sensors.

7. A vehicle HVAC system comprising:
a compressor comprising a low-pressure refrigerant inlet port, a high-pressure refrigerant discharge port, and an intermediate-pressure refrigerant inlet port;
a selector valve for switching between a cooling mode and a heating mode;
a first heat exchanger;
an intermediate heat exchange system comprising:
a first expansion device for decompressing a first portion of high-pressure refrigerant to an intermediate-pressure refrigerant;
a second heat exchanger for exchanging heat between the intermediate-pressure refrigerant and a second portion of high-pressure refrigerant, wherein the intermediate-pressure refrigerant is directed to the intermediate-pressure refrigerant inlet port of the compressor;
a second expansion device for decompressing the second portion of high-pressure refrigerant from the second heat exchanger to a low-pressure refrigerant;
a plurality of check valves configured to maintain a uniform flow direction through the second heat exchanger, the first expansion device, and the second expansion device in the cooling mode and the heating mode; and
a third heat exchanger;
wherein, in the cooling mode, the compressor is configured to output refrigerant such that the refrigerant flows from the compressor to the first heat exchanger, to the intermediate heat exchange system, to the third heat exchanger, and back to the compressor and, in the heating mode, the compressor is configured to output refrigerant such that the refrigerant flows from the compressor to the third heat exchanger, to the intermediate heat exchange system, to the first heat exchanger, and back to the compressor.

8. The vehicle HVAC system of claim 7, further comprising a coolant loop comprising the third heat exchanger, a coolant pump, and a fourth heat exchanger; wherein the third heat exchanger exchanges heat between the refrigerant and a coolant and the fourth heat exchanger exchanges heat between the coolant and inside air.

9. The vehicle HVAC system of claim 7, wherein the plurality of check valves comprises a cooling mode check valve set and a heating mode check valve set.

10. The vehicle HVAC system of claim 9, wherein the cooling mode check valve set comprises a first cooling mode check valve for directing refrigerant from the first heat exchanger to the intermediate heat exchange system and a second cooling mode check valve for directing refrigerant from the intermediate heat exchange system to the third heat exchanger while operating in the cooling mode and the heating mode check valve set comprises a first heating mode check valve for directing refrigerant from the third heat exchanger to the intermediate heat exchange system, and a second heating mode check valve for directing refrigerant from the intermediate heat exchange system to the first heat exchanger while operating in the heating mode.

11. The vehicle HVAC system of claim 7, further comprising an electronic control unit configured to control the selector valve, the compressor, and at least one of the first expansion device and the second expansion device based on input received from one or more sensors.

12. A vehicle HVAC system comprising:
a first heat exchanger;
a first check valve set;
a first expansion device;
a second heat exchanger;
a second expansion device;
a second check valve set;
a third heat exchanger; and
a compressor that is configured to output a first portion of refrigerant from the compressor to the first heat exchanger, to the first check valve, to the first expansion device, and onward to the second heat exchanger, and a second portion of refrigerant from the compressor to the first heat exchanger, to the first check valve, to the second heat exchanger, to the second expansion device, to the second check valve set, and onward to the third heat exchanger.

13. The vehicle HVAC system of claim 12, further comprising a coolant loop, the coolant loop comprising the third heat exchanger, a coolant pump, and a fourth heat exchanger.

14. The vehicle HVAC system of claim 12, further comprising a selector valve for switching between a heating mode and a cooling mode.

* * * * *